United States Patent
Baumann et al.

(10) Patent No.: US 10,619,061 B2
(45) Date of Patent: Apr. 14, 2020

(54) USE OF MOULDING COMPOUNDS BASED ON BLENDS OF SAN-COPOLYMERS AND POLYAMIDE FOR 3D PRINTING

(71) Applicant: INEOS STYROLUTION GROUP GMBH, Frankfurt am Main (DE)

(72) Inventors: Stephanie Baumann, Wuerzburg (DE); Frank Eisentraeger, Cologne (DE); Josef Meiners, Krefeld (DE); Norbert Niessner, Friedelsheim (DE); Hans-Werner Schmidt, Bayreuth (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 32 days.

(21) Appl. No.: 16/084,330

(22) PCT Filed: Mar. 16, 2017

(86) PCT No.: PCT/EP2017/056220
§ 371 (c)(1),
(2) Date: Sep. 12, 2018

(87) PCT Pub. No.: WO2017/158080
PCT Pub. Date: Sep. 21, 2017

(65) Prior Publication Data
US 2019/0092952 A1     Mar. 28, 2019

(30) Foreign Application Priority Data
Mar. 17, 2016   (EP) ..................................... 16160892

(51) Int. Cl.
*B33Y 10/00*     (2015.01)
*C08L 25/12*     (2006.01)
(Continued)

(52) U.S. Cl.
CPC ............ *C09D 11/106* (2013.01); *B33Y 70/00* (2014.12); *C08L 25/12* (2013.01); *C08L 55/02* (2013.01);
(Continued)

(58) Field of Classification Search
CPC .......... B33Y 10/00; C08L 25/10; C08L 25/12; C08L 55/02; C08L 77/02; C08L 2205/035
See application file for complete search history.

(56) References Cited

U.S. PATENT DOCUMENTS

| 4,634,734 A | 1/1987 | Hambrecht et al. |
| 6,323,279 B1 | 11/2001 | Guntherberg et al. |

(Continued)

FOREIGN PATENT DOCUMENTS

| CN | 104877297 A | 9/2015 |
| DE | 1260135 B | 2/1968 |

(Continued)

OTHER PUBLICATIONS

English Translation of International Preliminary Report on Patentability in International Application No. PCT/EP2017/056220, dated Sep. 27, 2018.

(Continued)

*Primary Examiner* — Vu A Nguyen
(74) *Attorney, Agent, or Firm* — J.A. Lindeman & Co. PLLC (57) ABSTRACT

The invention relates to the use of a thermoplastic moulding compound for 3D Printing, made of a mixture of the following components A-E: A: 35-60 wt. % impact resistant modified polymer A comprising: 30-95 wt. % SAN-copolymer and 5-70 wt. % ABS-graft copolymer; B: 33-58 wt. % aliphatic polyamide B; C: 1-10 wt. % SANMSA-terpolymer C as a compatibilizing agent; D: 0.01-5 wt. % processing agent D; and E: 0-30 wt. % other additives E.

13 Claims, 1 Drawing Sheet

(51) Int. Cl.
- *C08L 55/02* (2006.01)
- *C08L 77/02* (2006.01)
- *C09D 11/106* (2014.01)
- *B33Y 70/00* (2020.01)
- *C09D 11/107* (2014.01)
- *C09D 11/102* (2014.01)

(52) U.S. Cl.
CPC ............ *C08L 77/02* (2013.01); *C09D 11/102* (2013.01); *C09D 11/107* (2013.01); *B33Y 10/00* (2014.12); *C08L 2205/025* (2013.01); *C08L 2205/035* (2013.01)

(56) References Cited

U.S. PATENT DOCUMENTS

| | | |
|---|---|---|
| 6,423,817 B1 | 7/2002 | Weinerth et al. |
| 6,812,323 B1 | 11/2004 | Breiner et al. |
| 2003/0092836 A1 | 5/2003 | Eichenauer et al. |
| 2008/0071030 A1 | 3/2008 | Priedeman, Jr. |
| 2009/0295032 A1 | 12/2009 | Hopkins |
| 2014/0141168 A1 | 5/2014 | Rodgers |
| 2016/0312022 A1 | 10/2016 | Niessner et al. |

FOREIGN PATENT DOCUMENTS

| | | |
|---|---|---|
| DE | 3149358 A1 | 6/1983 |
| EP | 0993476 A1 | 4/2000 |
| EP | 1015215 A1 | 7/2000 |
| EP | 1087862 A1 | 4/2001 |
| EP | 1497093 A1 | 1/2005 |
| GB | 1124911 A | 8/1968 |
| GB | 1472195 A | 5/1977 |
| WO | 95/28443 A1 | 10/1995 |
| WO | 98/53974 A1 | 12/1998 |
| WO | 99/37454 A1 | 7/1999 |
| WO | 99/41297 A1 | 8/1999 |
| WO | 01/62848 A1 | 8/2001 |
| WO | 03/089222 A1 | 10/2003 |
| WO | 2012/065977 A1 | 5/2012 |
| WO | 2015/091817 A1 | 6/2015 |
| WO | WO-2015091817 A1 * | 6/2015 ............ C08L 25/12 |

OTHER PUBLICATIONS

R. Vieweg and G. Daumiller: Kunstroffhandbuch, Bd. 4 "Polystyrol", Carl-Hanser-Verlag Munich 1996, p. 104 ff, the relevance of which is discussed at p. 6, lines 3-5 of the specification (English-language translation).

Modern Styrenic Polymers: Polystyrenes and Styrenic Copolymers; Edited by J. Scheirs, D. Priddy, Wiley, Chichester, UK, 2003, p. 27-29, the relevance of which is discussed at p. 6, lines 3-6 of the specification (English-language translation).

* cited by examiner

USE OF MOULDING COMPOUNDS BASED ON BLENDS OF SAN-COPOLYMERS AND POLYAMIDE FOR 3D PRINTING

The invention relates to the use of thermoplastic molding compositions based on a blend (mixture) of impact-modified styrene/acrylonitrile (SAN) copolymer and polyamide for 3D printing.

The use of amorphous thermoplastics for 3D printing, especially of acrylonitrile-butadiene-styrene (ABS), is known. EP-A 1015215, for instance, describes a method for producing a three-dimensional object of predetermined shape from a material which can be consolidated thermally. For the 3D printing, the material is first fluidized and extruded, and two or more layers of the material are applied to a support, with movement, and then the shaped material is consolidated by cooling to below the solidification temperature of the material. Thermally consolidable material used comprises amorphous thermoplastics, especially acrylonitrile-butadiene-styrene (ABS).

EP-A 1087862 describes a rapid prototyping system for producing a three-dimensional article by extrusion and application of solidifiable thermoplastic modeling and support material in a plurality of layers. The thermoplastic material is supplied via a spool. ABS is cited as a suitable modelable material. As fragmentary support material, which is removed following completion of the 3D model, a mixture of ABS and a polystyrene copolymer as filling material with a fraction of up to 80% is used.

EP-A 1497093 describes a method for producing a prototype of a plastics injection molding from a thermoplastic material, which in fluidized form is injected into a mold until it fills the cavity of said mold and, after curing, forms the prototype. This prototype is produced via "Fused Deposition Modeling", a specific 3D printing method. The thermoplastic material is selected from: ABS, polycarbonate, polystyrene, acrylates, amorphous polyamides, polyesters, PPS, PPE, PEEK, PEAK, and mixtures thereof, with ABS being preferred. Contraction phenomena are avoided using preferably amorphous thermoplastics.

US 2008/0071030 describes a thermoplastic material which is used for producing three-dimensional models by multilayer deposition. The thermoplastic material comprises a base polymer selected from the group consisting of polyethersulfones, polyetherimides, polyphenylsulfones, polyphenylenes, polycarbonates, polysulfones, polystyrenes, acrylates, amorphous polyamides, polyesters, nylon, polyetheretherketones, and ABS, and 0.5 to 10 wt % of a silicone release agent.

Preference as base polymer is given to using polyethersulfone and mixtures thereof with polystyrene (3 to 8 wt %). In order to avoid contraction, preference is given to using amorphous polymers and optionally customary filling materials.

US 2009/0295032 proposes modified ABS materials for 3D printing. The ABS materials are modified by additional monomers, oligomers or polymers, more particularly acrylates. Given as an example are MMA-modified ABS/poly(styrene-acrylonitrile) blends, more particularly CYCOLAC ABS MG 94. The proportions of the components and the viscosity of the blends are not specified.

The aforementioned materials, however, are often too brittle for 3D printing, and are in need of improvement in relation both to toughness and to their odor. With the materials of the prior art, furthermore, the viscosity, under the conditions of the melt flow index at low shear rates, is often also too high and is likewise in need of improvement.

WO 2015/091817 discloses thermoplastic molding compositions for 3D printing with an improved toughness/viscosity balance, based on impact-modified vinylaromatic copolymers, especially styrene-acrylonitrile (SAN) copolymers. ABS graft rubbers are used preferably as impact modifier. The molding compositions may optionally include further polymers as well, selected from polycarbonates, polyamides, poly(meth)acrylates, polyesters, and vinylaromatic-diene copolymers (SBC), in an amount of 0 to 60 wt %, preferably 0 to 30 wt %. There are no examples of this.

With regard to the 3D printing of moldings which are demanding (with complicated design), involving bridging, the majority of molding compositions known from the prior art are still in need of improvement.

It is an object of the present invention to provide improved, low-odor thermoplastic materials for 3-D printing which are also suitable for the 3-D printing of overhangs such as stairs, and of bridges.

The object has been achieved through the use of the molding compositions described below for 3D printing.

A subject of the invention is the use of a thermoplastic molding composition for 3D printing, comprising or consisting of a mixture of the following components:

A: 35 to 60 wt % of at least one, preferably one, impact-modified polymer A, consisting of the components a and b:
  a: 30 to 95 wt % of at least one styrene-acrylonitrile copolymer a having an average molar mass Mw of 150 000 to 350 000 g/mol, obtained by polymerization of:
    a1: 18 to 35 wt % of acrylonitrile (AN), and
    a2: 82 to 65 wt % of styrene (S);
  b: 5 to 70 wt % of at least one graft copolymer b as impact modifier, with
    b1: 45 to 85 wt % of a graft base b1, obtained by polymerization of:
      b11: 80 to 100 wt % of 1,3-butadiene,
      b12: 0 to 20 wt % of styrene;
    b2: 15 to 55 wt % of a graft b2, obtained by polymerization of:
      b21: 70 to 90 wt %, preferably 72.5 to 85 wt %, of styrene;
      b22: 10 to 30 wt %, preferably 15 to 27.5 wt %, of acrylonitrile;
    where the sum of a and b, based on A, makes 100 wt %;
B: 33 to 58 wt % of at least one, preferably one, polyamide B selected from the following: polyamide 6 (polycaprolactam), polyamide 6,6 (polyhexamethyleneadipamide), polyamide 4,6 (polytetramethyleneadipamide), polyamide 5,10 (polypentamethyleneadipamide), polyamide 6,10 (polyhexamethylenesebacamide), polyamide 7 (polyenantholactam), polyamide 11 (polyundecanolactam), and polyamide 12 (polydodecanolactam);
C: 1 to 10 wt % of at least one, preferably one, compatibilizer C based on a styrene-acrylonitrile-maleic anhydride terpolymer obtained by polymerization of:
  C1: 72 to 84.5 wt %, preferably 74 to 84 wt %, of styrene;
  C2: 15 to 27.5 wt %, preferably 15 to 25 wt %, of acrylonitrile;
  C3: 0.5 to 5 wt %, preferably 1 to 3 wt %, of maleic anhydride (MAn);
D: 0.01 to 5 wt % of one or more auxiliaries D selected from the following: stabilizers, oxidation retarders, agents against thermal decomposition and decomposition by ultraviolet light, lubricants and mold release agents, processing assistants, and plasticizers;
E: 0 to 30 wt % of one or more further additives E;

where the sum of the components A, B, C, D and, if present, E makes 100 wt % (of the molding composition).

In general the viscosity (measured to ISO 11443:2014) of the molding composition used in accordance with the invention at shear rates of 1 to 10 1/s and at temperatures of 250° C. is not more than $1 \times 10^5$ Pa*s and the melt volume rate (MVR, measured to ISO 1133-1:2011 at 240° C. and 10 kg load) of the molding composition is more than 15 ml/10 min. The sum of the amounts, reported in wt %, of the aforementioned components a1 and a2, b11 and b12, b21 and b22, C1, C2, and C3 is in each case always 100 wt %.

The weight-average molar mass Mw is determined by GPC (solvent: tetrahydrofuran, polystyrene as polymer standard) with UV detection (DIN EN ISO 16014-5:2012-10).

For the purposes of the present invention, 3D printing refers to the production of three-dimensional moldings by means of a device suitable for 3D printing (3D printer). The 3D printer used in accordance with the invention is more particularly a 3D printer which is suitable for the fused deposition modeling (FDM) method.

The FDM method is a fusion layering method wherein filaments of a molding composition suitable for 3D printing are fluidized by heating in the 3D printer, after which the fluidized molding composition is applied layer by layer to a moving construction platform (printing bed) or to a previous layer of the molding composition, by extrusion with a heating nozzle which is freely movable within the fabrication plane, and then the shaped material is consolidated, optionally by cooling.

Preference is given to a molding composition as described above, used in accordance with the invention, consisting of:
35 to 50 wt % of component A,
40 to 58 wt % of component B,
1 to 10 wt % of component C,
0.01 to 5 wt % of component D, and
0 to 20 wt % of component E.

Particular preference is given to a molding composition as described above, used in accordance with the invention, consisting of:
35 to 50 wt % of component A,
45 to 58 wt % of component B,
1 to 10 wt % of component C,
0.01 to 5 wt % of component D, and
0 to 10 wt % of component E.

Very particular preference is given to a molding composition as described above, used in accordance with the invention, consisting of:
40 to 50 wt % of component A,
45 to 55 wt % of component B,
2 to 6 wt % of component C,
0.05 to 3 wt % of component D, and
0 to 10 wt % of component E.

Further very particular preference is given to a molding composition as described above, used in accordance with the invention, consisting of:
40 to 49.95 wt % of component A,
48 to 55 wt % of component B,
2 to 6 wt % of component C,
0.05 to 3 wt % of component D, and
0 to 9.95 wt % of component E.

Preferred among aforesaid molding compositions are those from which component E is absent.

Suitable molding compositions which can be used in accordance with the invention are also available commercially as Terblend® N NM-21 EF from Ineos Styrolution.

Impact-Modified Polymer A

In the impact-modified polymer A, preferably, the fraction of component a is 30 to 60 wt % and the fraction of graft copolymer b, used as impact modifier, is 70 to 40 wt %.

In the impact-modified polymer A, more preferably, the fraction of component a is 40 to 60 wt % and the fraction of graft copolymer b, used as impact modifier, is 60 to 40 wt %.

In the impact-modified polymer A, very preferably, the fraction of component a is 50 to 60 wt % and the fraction of graft copolymer b is 50 to 40 wt %.

SAN Copolymer a

The SAN copolymer a forms a hard phase having a glass transition temperature TG of >20° C.

SAN copolymers a used in accordance with the invention contain generally 18 to 35 wt %, preferably 20 to 32 wt %, more preferably 22 to 30 wt % of acrylonitrile (AN), and 82 to 65 wt %, preferably 80 to 68 wt %, more preferably 78 to 70 wt % of styrene (S), the sum of styrene and acrylonitrile making 100 wt %.

The SAN copolymers a used generally have a weight-average molar mass Mw of 150 000 to 350 000 g/mol, preferably 150 000 to 250 000 g/mol, and very preferably 150 000 to 200 000 g/mol.

The SAN copolymer a customarily has a viscosity number VN (determined to DIN 53 726 at 25° C., on a 0.5 wt % strength solution of the polymer a in dimethylformamide) of 52 to 100 and preferably 55 to 80 ml/g.

The SAN copolymers a are obtained in a known way by bulk, solution, suspension, precipitation or emulsion polymerization, with bulk and solution polymerization being preferred. Details of these processes are described for example in Kunststoffhandbuch, edited by R. Vieweg and G. Daumiller, volume 4 "Polystyrol", Carl-Hanser-Verlag Munich 1996, p. 104 ff, and also in "Modern Styrenic Polymers: Polystyrenes and Styrenic Copolymers" (Eds., J. Scheirs, D. Priddy, Wiley, Chichester, UK, (2003), pages 27 to 29), and in GB-A 1472195.

Suitable SAN copolymers a are commercial SAN copolymers such as Luran® from Ineos Styrolution, for example. Preferred SAN copolymers are those having an S/AN ratio (in weight percent) of 81/19 to 67/33 and an MVR (measured to ISO 1133 at 220° C. and 10 kg load) of at least 10 ml/10 min such as Luran 368, for example. Further preferred for use are SAN copolymers having an S/AN ratio (in weight percent) of 81/19 to 65/35 and an MVR (measured to ISO 1133 at 220° C. and 10 kg load) of at least 8 ml/10 min such as Luran M60, Luran VLL1970, Luran 25100, Luran VLP, and Luran VLR, for example; particularly preferred among the aforementioned SAN copolymers are those having an MVR of at least 10 ml/10 min.

Graft Copolymer (Impact Modifier) b

Employed as impact modifier in accordance with the invention is at least one acrylonitrile-butadiene-styrene (ABS) impact modifier or at least one acrylonitrile-butadiene-styrene graft copolymer b. The ABS impact modifier forms a soft phase having a glass transition temperature TG of <0° C., preferably <−20° C., more preferably <−40° C.

The particle size of the impact modifiers b used in accordance with the invention is generally at least 80 nm and at most 1 µm, preferably 100 nm to 600 nm, more preferably 150 nm to 500 nm, very preferably 200 nm to 450 nm. The particle size here refers to the average particle diameter $d_{50}$.

The average particle diameter $d_{50}$ can be determined via ultracentrifuge measurement (cf. W. Scholtan, H. Lange: Kolloid Z. u. Z. Polymere 250, pp. 782 to 796 (1972)).

It is possible to use one or more impact modifiers b, having uni-, bi-, tri- or multimodal particle size distributions.

Used in accordance with the invention is at least one graft copolymer (impact modifier) b with
b1: 45 to 85 wt %, preferably 50 to 80 wt %, more preferably 55 to 75 wt %, of a graft base b1 obtained by polymerization of:
   b11: 80 to 100 wt %, preferably 90 to 100 wt %, of 1,3-butadiene,
   b12: 0 to 20 wt %, preferably 0 to 10 wt %, of styrene;
b2: 15 to 55 wt %, preferably 20 to 50 wt %, more preferably 25 to 45 wt %, of a graft b2, obtained by polymerization of:
   b21: 70 to 90 wt %, more particularly 72.5 to 85 wt %, more preferably 75 to 85 wt % of styrene;
   b22: 10 to 30 wt %, more particularly 15 to 27.5 wt %, more preferably 15 to 25 wt % of acrylonitrile.

Preference is given to at least one graft copolymer b with
b1: 50 to 80 wt % of a graft base 131 obtained by polymerization of:
   b1: 100 wt % of butadiene; and
b2: 20 to 50 wt % of a graft b2 obtained by polymerization of:
   b21: 70 to 90 wt %, more particularly 72.5 to 85 wt %, of styrene,
   b22: 10 to 30 wt %, more particularly 15 to 27.5 wt %, of acrylonitrile.

As graft base 131 it is possible to use commercial butadiene or butadiene-styrene rubbers, preferably butadiene rubbers.

Suitable butadiene rubbers 131 and ABS graft copolymers or ABS impact modifiers b are described in EP 0 993 476 B1 and in the publication WO 01/62848 A1.

The soft component is preferably a copolymer of multistage construction ("core/shell morphology"). For example, an elastomeric core (glass transition temperature Tg<50° C.) may be enveloped by a "hard" shell (polymers with Tg>50° C.), or vice versa. Core/shell graft copolymers of such kinds are known.

Methods for producing the graft copolymers or impact modifiers b are known to the skilled person and described in the literature. Some corresponding products are available commercially. Preparation by emulsion polymerization has proven particularly advantageous (EP 0 993 476 B1 and WO 01/62848 A1).

Polymerization is carried out customarily at 20 to 100° C., preferably 30 to 80° C. In general, customary emulsifiers are used as well, examples being alkali metal salts of alkylsulfonic or alkylarylsulfonic acids, alkyl sulfates, fatty alcohol sulfonates, salts of higher fatty acids having 10 to 30 carbon atoms, sulfosuccinates, ethersulfonates, or resin soaps. Preference is given to taking the alkali metal salts, more particularly the Na and K salts, of alkyl-sulfonates or fatty acids having 10 to 18 carbon atoms.

In general the emulsifiers are used in amounts of 0.5 to 5 wt %, more particularly of 0.5 to 3 wt %, based on the monomers used in the preparation of the graft base b1.

The dispersion is preferably prepared using water in an amount such that the completed dispersion has a solids content of 20 to 50 wt %. It is usual to operate at a water/monomer ratio of 2:1 to 0.7:1.

Radical initiators suitable for initiating the polymerization reaction are all those which decompose at the selected reaction temperature, in other words not only those which decompose by heat alone but also those which do so in the presence of a redox system. Polymerization initiators contemplated are preferably radical initiators, examples being peroxides such as preferably peroxosulfates (for instance, sodium or potassium persulfate), and azo compounds such as azodiisobutyronitrile. It is, though, also possible to use redox systems, especially those based on hydroperoxides such as cumene hydroperoxide.

The polymerization initiators are used generally in an amount of 0.1 to 1 wt %, based on the graft base monomers b11) and b12).

The radical initiators and the emulsifiers too are added to the reaction mixture, for example, discontinuously as the total amount at the start of the reaction, or divided into a plurality of portions, batchwise, at the start and at one or more later times, or continuously, over a defined time interval. Continuous addition may also take place along a gradient, which may for example be ascending or descending, linear or exponential, or else staged (step function).

Furthermore, accompanying use may be made of chain transfer agents such as, for example, ethylhexyl thioglycolate, n- or tert-dodecyl mercaptan or other mercaptans, terpinols, and dimeric alpha-methylstyrene, or other compounds suitable for regulating the molecular weight. The chain transfer agents are added continuously or discontinuously to the reaction mixture, as described above for the radical initiators and emulsifiers.

In order to maintain a constant pH, situated preferably at 6 to 9, it is possible for buffer substances to be used as well such as $Na_2HPO_4/NaH_2PO_4$, sodium hydrogencarbonate, or buffers based on citric acid/citrate. Chain transfer agents and buffer substances are used in the customary amounts, and so further details are unnecessary.

In one particularly preferred embodiment, a reducing agent is added during the grafting of the graft base b1 with the monomers b21) to b22).

The graft base b1, in one particular embodiment, may also be prepared by polymerizing the monomers b11) to b12) in the presence of a finely divided latex ("seed latex mode" of polymerization). This latex is included in the initial charge and may consist of monomers that form rubber-elastic polymers, or else of other monomers, as already stated. Suitable seed latices consist for example of polybutadiene or polystyrene.

In the case of the seed polymerization technique, it is usual first to prepare a finely divided polymer, preferably a polybutadiene, as seed latex and then to continue polymerization by ongoing reaction with butadiene-containing monomers to form larger particles (see, for example, in Houben Weyl, Methoden der Organischen Chemie, Makromolekulare Stoffe

[Macromolecular compounds] Part 1, p. 339 (1961), Thieme Verlag Stuttgart). Operation in this case is carried out preferably using the seed batch method or the seed feed method.

Through the use of seed latices—especially polybutadiene seed latices—having an average particle diameter $d_{50}$ of 25 to 200 nm, preferably of 30 to 180 nm, and more preferably of 60 to 170 nm, polybutadiene latices b1 having an average particle diameter $d_{50}$ of 200 to 600 nm, preferably 230 to 480 nm, more preferably of 240 to 470 nm, very preferably of 250 to 460 nm, can be obtained.

Where seed latices are used that have average particle diameters $d_{50}$ of more than 80 nm, preferably more than 90 nm, and more preferably more than 100 nm, the seed latices themselves are also prepared preferably by seed polymerization. This is done using preferably seed latices having average particle diameters $d_{50}$ of 10 to 60 nm, preferably 20 to 50 nm.

Preferred graft bases b1 and graft copolymers or impact modifiers b can be obtained by the seed polymerization technique described in document WO 01/62848 A1.

In another preferred embodiment, the graft base b1 may be prepared by what is called a feed process.

With this process, a certain fraction of the monomers b11) and optionally b12) is introduced as an initial charge and the polymerization is initiated, after which the remainder of the monomers b11) and optionally b12) ("feed fraction") are added as a feed during the polymerization.

The feed parameters (gradient design, quantity, duration, etc.) are dependent on the other polymerization conditions. Here as well, mutatis mutandis, the observations apply that were made in relation to the mode of addition of the radical initiator and the emulsifier. With the feed process, the fraction of the monomers b11) that is included in the initial charge is preferably 5 to 50 wt %, more preferably 8 to 40 wt %, based on b1. The feed fraction of b11) and optionally b12) is run in preferably over the course of 1-18 hours, more particularly 2-16 hours, especially 4 to 12 hours.

Also suitable, furthermore, are graft polymers having a plurality of "soft" and "hard" shells, with a construction, for example, of b1)-b2)-b1)-b2), or b2)-b1)-b2), especially in the case of relatively large particles.

The precise polymerization conditions, particularly the nature, quantity, and metering of the emulsifier and of the other polymerization auxiliaries, are preferably selected such that the resulting graft copolymer b latex, or the latex of the impact modifier b, has an average particle size, defined by the $d_{50}$ of the particle size distribution, of 80 to 1000 nm, preferably 85 to 600 nm, and more preferably 90 to 500 nm.

The polymerization conditions may also be harmonized with one another such that the polymer particles have a bimodal particle size distribution, in other words a size distribution having two more or less pronounced maxima. The first maximum is more significantly pronounced (comparatively narrow peak) than the second, and is situated in general at 25 to 200 nm, preferably 60 to 170 nm, more preferably 70 to 150 nm. The second maximum is comparatively broad and is situated in general at 150 to 800 nm, preferably 180 to 700 nm, more preferably 200 to 600 nm, very preferably 250 nm to 460 nm. The second maximum (150 to 800 nm) here is situated at larger particle sizes than the first maximum (25 to 200 nm).

In a bimodal particle size distribution, often the first maximum (b1') of the graft base b1 is situated at an average particle size $d_{50}$ of 25 to 200 nm, preferably 30 to 180 nm, more preferably 60 to 170 nm, and the second maximum (b1") of the graft base b1 is situated at an average particle size $d_{50}$ of 230 to 480 nm, very preferably 240 to 470 nm, especially preferably 250 to 460 nm.

According to another embodiment, the particle size distribution of the graft base b1 is trimodal: the first maximum (b1') of the graft base b1 is situated at an average particle size $d_{50}$ of 25 to 200 nm, preferably 30 to 180 nm, more preferably 60 to 170 nm, and the second maximum (b1") of the graft base b1 is situated at an average particle diameter $d_{50}$ of 230 to 330 nm, preferably of 240 to 320 nm, and more preferably of 250 to 310 nm, and the third maximum (b1'") possesses an average particle diameter $d_{50}$ of 340 to 480 nm, preferably of 350 to 470 nm, and more preferably of 360 to 460 nm.

The bimodal particle size distribution is obtained preferably by means of (partial) agglomeration of the polymer particles. The approach taken for this may be as follows, for example: the monomers b11) and optionally b12), which construct the core, are polymerized to a conversion of customarily at least 90%, preferably greater than 95%, based on the monomers used. This conversion is generally reached after 4 to 20 hours. The resulting rubber latex has an average particle size $d_{50}$ of at most 200 nm and a narrow particle size distribution (virtually monodisperse system).

In the second stage, the rubber latex is agglomerated. This is generally done by adding a dispersion of an acrylic ester polymer. Preference is given to using dispersions of copolymers of C1-C4 alkyl esters of acrylic acid, preferably of ethyl acrylate, with 0.1 to 10 wt % of monomers that form polar polymers, such as acrylic acid, methacrylic acid, acrylamide or methacrylamide, N-methylolmethacrylamide or N-vinylpyrrolidone, for example. Particularly preferred is a copolymer of 96% ethyl acrylate and 4% methacrylamide. The agglomerating dispersion may optionally also comprise two or more of the stated acrylic ester polymers.

The concentration of the acrylic ester polymers in the dispersion used for the agglomeration is in general to be between 3 and 40 wt %. In the agglomeration, 0.2 to 20, preferably 1 to 5, parts by weight of the agglomerating dispersion are used per 100 parts of the rubber latex, calculated in each case on solids. The agglomeration is carried out by adding the agglomerating dispersion to the rubber. The rate of addition is normally not critical, with addition lasting generally for about 1 to 30 minutes at a temperature between 20 and 90° C., preferably between 30 and 75° C.

Apart from by means of an acrylic ester polymer dispersion, the rubber latex may also be agglomerated by other agglomerating agents such as acetic anhydride, for example. Also possible is agglomeration by pressure or freezing (pressure or freeze agglomeration). The methods stated are known to the skilled person.

Under the conditions stated, only some of the rubber particles are agglomerated, producing a bimodal distribution. After the agglomeration here, generally more than 50%, preferably between 75 and 95% of the particles (numerical distribution) are present in the unagglomerated state. The partly agglomerated rubber latex obtained is comparatively stable, and so it can readily be stored and transported without coagulation occurring.

In order to obtain a bimodal particle size distribution of the graft copolymer b, it is also possible to prepare two different graft polymers b' and b", which differ in their average particle size, in a customary way separately from one another, and to combine the graft copolymers b' and b" in the desired quantitative ratio.

In order to obtain a trimodal particle size distribution of the graft copolymer b, it is also possible to carry out conventional preparation of two different graft bases b1' and b1", differing in their average particle size, separately from one another, to combine the graft bases in the desired ratio prior to grafting (or else, optionally, afterward), and then to graft on the graft and subsequently to add, in the desired quantitative ratio, a third, separately prepared, graft copolymer b'" to the resultant graft copolymers b' and b", this copolymer b'" differing from b' and b" in terms of its average particle size.

The average particle diameter $d_{50}$ can be determined by ultracentrifuge measurement (cf. W. Scholtan, H. Lange: Kolloid Z. u. Z. Polymere 250, pp. 782 to 796 (1972)); the values reported for the gel content are based on determination via the wire cage method in toluene (cf. Houben-Weyl, Methoden der Organischen Chemie, Makromolekulare Stoffe [Macromolecular compounds], part 1, p. 307 (1961), Thieme Verlag Stuttgart).

The gel contents can be adjusted in a manner known in principle through application of suitable reaction conditions (e.g., high reaction temperature and/or polymerization to a high conversion, and, optionally, addition of crosslinking substances to obtain a high gel content, or, for example, low reaction temperature and/or termination of the polymerization reaction prior to excessive crosslinking, and also, optionally, addition of chain transfer agents, to achieve a low gel content).

Through the choice of the reaction conditions, the polymerization of the graft base b1 is customarily conducted in such a way as to result in a graft base having a defined crosslinking state. Examples of parameters essential for this are the reaction temperature and reaction time, the ratio of monomers, chain transfer agents, radical initiators, and, in the case of the feed process, for example, the feed rate and the amount and timing of addition of chain transfer agent and initiator.

One method for characterizing the state of crosslinking of crosslinked polymer particles is the measurement of the swelling index SI, which is a measure of the swellability by a solvent of a polymer with greater or lesser crosslinking. Examples of customary swelling agents are methyl ethyl ketone or toluene. The SI of the molding compositions of the invention is situated customarily in the SI=10 to 60 range, preferably 15 to 55, and more preferably 20 to 50.

Another method for characterizing the state of crosslinking is to measure NMR relaxation times of the mobile protons, referred to as T2 times. The greater the crosslinking of a particular network, the lower its T2 times. Customary T2 times for the graft bases b1 of the invention are T2 times in the 2.0 to 4.5 ms range, preferably 2.5 to 4.0 ms, and more preferably 2.5 to 3.8 ms, measured on filmed samples at 80° C.

A further measure for characterizing the graft base and the state of crosslinking thereof is the gel content, in other words that fraction of the product that is crosslinked and is therefore not soluble in a particular solvent. Rationally, the gel content is determined in the same solvent as the swelling index.

Customary gel contents of the graft bases used in the invention are in the 50 to 90% range, preferably 55 to 85%, and more preferably 60 to 80%.

The swelling index is determined, for example, by the following method: around 0.2 g of the solids of a graft base dispersion filmed by evaporation of water are swollen in a sufficient amount (e.g., 50 g) of toluene. After 24 hours, for example, the toluene is drawn off under suction and the sample is weighed. After the sample has been dried under reduced pressure it is weighed again. The swelling index is the ratio of the final mass after the swelling operation to the final dry mass after the further drying. Accordingly, the gel fraction is computed from the ratio of the dry mass after the swelling step to the initial mass before the swelling step (×100%).

The T2 time is determined by measuring the NMR relaxation of a dewatered, filmed sample of the graft base dispersion. For this purpose, for example, the sample is dried under reduced pressure for 3 hours at 60° C., for example, after having been flashed off overnight, and then is measured with a suitable measuring instrument, e.g., a minispec from Brucker, at 80° C. Samples are comparable only if they have been measured by the same method, since relaxation is significantly temperature-dependent.

The graft b2 may be produced under the same conditions as for the production of the graft base b1, and the graft b2 can be produced in one or more process steps.

In the case of a two-stage grafting, for example, first styrene alone and thereafter styrene and acrylonitrile can be polymerized in two successive steps. This two-stage grafting (first styrene, then styrene/acrylonitrile) is one preferred embodiment. Further details on the preparation of the graft copolymers or the impact modifiers b are described in DE 12 60 135 and DE 31 49 358.

It is advantageous for the graft polymerization onto the graft base b1 to be carried out in turn in aqueous emulsion. It can be performed in the same system as the polymerization of the graft base, in which case emulsifier and initiator may further be added. They need not be identical to the emulsifiers and initiators used for preparing the graft base b1. For example, it may be useful, as initiator for preparing the graft base b1, to use a persulfate, but to use a redox initiator system for the polymerization of the graft shell b2. Otherwise, the selection of emulsifier, initiator, and polymerization auxiliaries is governed by the statements made with regard to the preparation of graft base b1. The monomer mixture to be grafted on may be added to the reaction mixture all at once, in batches in two or more stages, or, preferably, continuously during the polymerization.

Where ungrafted polymers of the monomers b21) to b22) are formed during the grafting of the graft base b1, the amounts, which are in general below 10 wt % of b2, are assigned to the mass of component b.

Polyamide B

As component B, the molding compositions used in accordance with the invention comprise one or more than one, but preferably one, polyamide B. Polyamides and their preparation are known to the skilled person and described in the literature (see, for example, Polyamide, Kunststoff-Handbuch 3/4, Carl Hanser Verlag (7/98); U.S. Pat. No. 6,812,323; WO 95/28443; WO 99/41297).

Polyamides B are understood to be homopolymers or copolymers which as an essential constituent have amide groups repeating in the main chain of the polymer. Used in accordance with the invention are one or more polyamides B selected from the following: polyamide 6 (polycaprolactam), polyamide 6,6 (polyhexamethyleneadipamide), polyamide 4,6 (polytetramethyleneadipamide), polyamide 5,10 (polypentamethyleneadipamide), polyamide 6,10 (polyhexamethylenesebacamide), polyamide 7 (polyenantholactam), polyamide 11 (polyundecanolactam), and polyamide 12 (polydodecanolactam).

Preferred for use as component B is polyamide 6 and/or polyamide 6,6, more preferably polyamide 6.

Examples of suitable starting monomers or starting oligomers for preparing the aforesaid polyamides are monomers or oligomers of amino acids, such as 6-aminocaproic acid, 11-aminoundecanoic acid, and also their dimers, trimers, tetramers, pentamers or hexamers; monomers or oligomers of amino acid amides, such as 6-aminocaproamide, 11-aminoundecanamide, and also their dimers, trimers, tetramers, pentamers or hexamers; monomers or oligomers of an alkyldiamine, such as tetramethylenediamine or preferably hexamethylenediamine, with an aliphatic dicarboxylic acid, such as sebacic acid, decanedicarboxylic acid or adipic acid, and also their dimers, trimers, tetramers, pentamers or hexamers; monomers or oligomers of aliphatic lactam, such as enantholactam, undecanolactam, dodecanolactam or caprolactam, and also homopolymers, copolymers or mixtures of such starting monomers or starting oligomers.

The molecular weights Mn (number average) of the polyamides suitable as component B are preferably in the range between 5000 and 100 000, more preferably between 10 000 and 80 000.

Preferred polyamides B are those having a relative viscosity of 2.2 to 4.5 as measured at 0.5% strength solution (0.5 g/100 ml) in 96 wt % strength sulfuric acid at 25° C.

Polyamide 6, for example, is available commercially as Ultramid® B from BASF SE (Ludwigshafen).

Compatibilizer C

Styrene-acrylonitrile-maleic anhydride (SANMAn) terpolymers C used in accordance with the invention as compatibilizer C contain in general 72 to 84.5 wt %, preferably 74 to 84 wt %, of styrene C1; 15 to 27.5 wt %, preferably 15 to 25 wt %, of acrylonitrile C2; and 0.5 to 5 wt %, preferably 1 to 3 wt %, of maleic anhydride (MAn) C3, with the sum of C1, C2, and C3 making 100 wt/0.

The SANMAn terpolymers C generally have an average molar mass Mw of 30 000 to 500 000 g/mol, preferably of 50 000 to 250 000 g/mol, more preferably of 70 000 to 200 000 g/mol. The weight-average molar mass Mw is determined by GPC (solvent: tetrahydrofuran, polystyrene as polymer standard) with UV detection (DIN EN ISO 16014-5:2012-10).

The SANMAn terpolymers C are obtained in a known manner by bulk, solution, suspension, precipitation or emulsion polymerization, with preference being given to bulk and solution polymerization. Details of these processes are described for example in Kunststoffhandbuch, edited by R. Vieweg and G. Daumiller, vol. 4 "Polystyrol", Carl-Hanser-Verlag Munich 1996, p. 104 ff, and also in "Modern Styrenic Polymers: Polystyrenes and Styrenic Copolymers" (Eds., J. Scheirs, D. Priddy, Wiley, Chichester, UK, (2003), pages 27 to 29), and in GB-A 1472195.

Auxiliaries D

The molding composition used in accordance with the invention comprises one or more auxiliaries D selected from the following: stabilizers, oxidation retarders, agents against thermal decomposition and decomposition by ultraviolet light, lubricants and mold release agents, processing assistants, and plasticizers. The total amount of the auxiliaries D is generally 0.01 to 5 wt %, more particularly 0.05 to 3 wt %, based on the weight of the thermoplastic molding composition.

Auxiliaries D comprised preferably in the molding composition are stabilizers, oxidation retarders, agents against thermal decomposition and decomposition by ultraviolet light.

Oftentimes 2 or more different auxiliaries D from those stated are used.

Examples of oxidation retarders and heat stabilizers are halides of metals from group I of the periodic table, examples being sodium, potassium and/or lithium halides, optionally in combination with copper(I) halides, e.g., chlorides, bromides, iodides, sterically hindered phenols, hydroquinones, various substituted representatives of these groups, and mixtures thereof, in concentrations of up to 1 wt %, based on the weight of the thermoplastic molding composition.

UV stabilizers, used generally in amounts of up to 2 wt %, based on the molding composition, include various substituted resorcinols, salicylates, benzotriazoles, and benzophenones.

Lubricants and mold release agents, which may be used in general in amounts of up to 1 wt %, are, for example, long-chain fatty acids such as stearic acid or behenic acid, their salts (e.g., Ca, Mg or Zn stearate) or esters (e.g., stearyl stearate or pentaerythritol tetrastearate), and also amide derivatives (e.g., ethylenebisstearylamide).

Processing assistants which may used include, for example, mineral oil, preferably medical white oil, in amounts of up to 5 wt %, preferably up to 2 wt %.

Examples of plasticizers include dioctyl phthalate, dibenzyl phthalate, butyl benzyl phthalate, hydrocarbon oils, N-(n-butyl)benzenesulfonamide, and o- and p-tolylethylsulfonamide.

Additives E

The molding composition used in accordance with the invention may further optionally comprise one or more customary additives E, different from the auxiliaries D, such as colorants, dyes, and pigments, fibrous and pulverulent filling and reinforcing agents, nucleating agents, flame retardants, etc., the fraction thereof being in general not more the 30 wt %, preferably not more than 20 wt %, more preferably not more than 10 wt %, based on the total molding composition.

If there are one or more additives E in the molding composition, the minimum fraction thereof is customarily 0.01 wt %, preferably 0.05 wt %, particularly 0.1 wt %.

As colorants it is possible to add organic dyes such as nigrosine, pigments such as titanium dioxide, phthalocyanines, ultramarine blue, and carbon black, and also fibrous and pulverulent fillers and reinforcing agents. Examples of the latter are carbon fibers, glass fibers, amorphous silica, calcium silicate (wollastonite), aluminum silicate, magnesium carbonate, kaolin, chalk, powdered quartz, mica, and feldspar. The fraction of such fillers and colorants is generally up to 30 wt %, preferably up to 20 wt %, more preferably up to 10 wt %.

Examples of nucleating agents which can be used include talc, calcium fluoride, sodium phenylphosphinate, aluminum oxide, silicon dioxide, and Nylon 22.

For better processing it is possible for mineral-based antiblocking agents to be added in amounts of up to 0.1 wt % to the molding compositions of the invention. Examples include amorphous or crystalline silica, calcium carbonate, or aluminum silicate.

In order to improve further the resistance to inflammation, it is possible to add all flame retardants known for the thermoplastics in question, especially those retardants based on phosphorus compounds, or red phosphorus itself.

Production of the Molding Compositions

The molding compositions used in accordance with the invention and made up of the components A, B, C, D, and optionally E, may be produced by all known methods.

Regarding the production of the thermoplastic molding compositions, the following may be observed specifically:

The graft copolymers or impact modifiers b with uni-, bi- or trimodal particle size distribution are prepared by the process of emulsion polymerization, as already described above. As described above, the desired particle size distribution can be established by means of suitable measures familiar to the skilled person.

The resulting dispersion of the graft polymers or impact modifiers b may either be mixed directly with components a, B, C and/or D, and also optionally E, or it may be worked up beforehand. The latter approach is preferred.

The dispersion of the graft copolymers or impact modifiers b is worked up in a manner known per se. Customarily, first of all, the graft copolymer b is precipitated in the dispersion, by addition of precipitating salt solutions (such as calcium chloride, magnesium sulfate, alum) or acids (such as acetic acid, hydrochloric acid or sulfuric acid), for example, or else by freezing (freeze coagulation). The aqueous phase can be removed in a customary way, for instance by sieving, filtering, decanting or centrifuging. This prior separation of the dispersion water produces water-moist graft copolymers and/or impact modifiers b having a residual water content of up to 60 wt %, based on b, in which case the residual water, for example, may adhere externally to the graft copolymer b and may also be included within it.

The graft copolymer b can subsequently, as and when required, be dried further in a known way, for example, using hot air or by means of a pneumatic dryer. It is also possible to work up the dispersion by spray drying.

The graft copolymers b are customarily mixed with the SAN copolymer a, the polyamide B, and with the further components C, D, and optionally E, in a mixing apparatus, producing a substantially liquid-melt polymer mixture.

"Substantially liquid-melt" means that the polymer mixture, as well as the predominant liquid-melt (softened) fraction, may further comprise a certain fraction of solid constituents, examples being unmelted fillers and reinforcing materials such as glass fibers, pigments, colorants, etc. "Liquid-melt" means that the polymer mixture is at least of low fluidity, therefore having softened at least to an extent that it has plastic properties.

Mixing apparatuses used are those known to the skilled person. Components a, b, B, C, D and E may be mixed, for example, by joint extrusion, kneading, or rolling, the aforementioned components necessarily having been isolated beforehand from the aqueous dispersion or from the solution obtained in the polymerization.

Where one or more components in the form of an aqueous dispersion or of an aqueous or nonaqueous solution are mixed in, the water and/or the solvent is removed from the mixing apparatus, preferably an extruder, via a degassing unit.

Examples of mixing apparatus for implementing the method include discontinuously operating, heated internal kneading devices with or without ram, continuously operating kneaders, such as continuous internal kneaders, screw kneaders with axially oscillating screws, Banbury kneaders, furthermore extruders, and also roll mills, mixing roll mills with heated rolls, and calenders.

A preferred mixing apparatus used is an extruder. Particularly suitable for melt extrusion are, for example, single-screw or twin-screw extruders. A twin-screw extruder is preferred.

In some cases the mechanical energy introduced by the mixing apparatus in the course of mixing is enough to cause the mixture to melt, meaning that the mixing apparatus does not have to be heated. Otherwise, the mixing apparatus is generally heated. The temperature is guided by the chemical and physical properties of components a and b and—when present—B and/or C, and should be selected such as to result in a substantially liquid-melt polymer mixture. On the other hand, the temperature is not to be unnecessarily high, in order to prevent thermal damage of the polymer mixture. The mechanical energy introduced may, however, also be high enough that the mixing apparatus may even require cooling. The mixing apparatus is operated customarily at 160 to 400, preferably 180 to 300° C.

In one preferred embodiment the mixing of the graft polymer b with the SAN copolymer a, the polyamide B, and the further components C, D, and optionally E, takes place in an extruder, with the dispersion of the graft copolymer b being metered directly into the extruder, without prior removal of the dispersion water. The water is customarily removed along the extruder via suitable degassing facilities. Degassing facilities used may be, for example, degassing vents which are provided with retention screws (preventing the emergence of the polymer mixture).

In another, likewise preferred embodiment, the mixing of the aforementioned components takes place in an extruder, with the graft copolymer b being separated beforehand from the dispersion water. As a result of this prior removal of the dispersion water, water-moist graft copolymers b are obtained which have a residual water content of up to 60 wt %, based on b. The residual water present may then be removed in vapor form as described above via devolatilizing facilities in the extruder. With particular preference, however, the residual water in the extruder is not removed solely as steam; instead, a part of the residual water is removed mechanically in the extruder and leaves the extruder in the liquid phase. In the case of this so-called squeeze method (EP-B 0 993 476, pp. 13-16), the same extruder is supplied with the SAN copolymer a, the polyamide B, and the components C, D, and optionally E, meaning that the product of the method extruded is the completed molding composition.

Another feature of the molding composition used in accordance with the invention is that its residual monomer content is not more than 2000 ppm, preferably not more than 1000 ppm, more preferably not more than 500 ppm. Residual monomer content refers to the fraction of unreacted (uncopolymerized) monomers in the molding composition.

Furthermore, the molding composition used in accordance with the invention features a solvent content, such as the content of ethylbenzene, toluene, etc., for example, of not more than 1000 ppm, preferably not more than 500 ppm, more preferably not more than 200 ppm.

The low residual monomer content and solvent content can be obtained by employing customary methods for reducing residual monomers and solvents from polymer melts, as described for example in Kunststoffhandbuch, Eds. R. Vieweg and G. Daumiller, vol. 4 "Polystyrol", Carl-Hanser-Verlag Munich (1996), pp. 121 to 139. In these methods, typical devolatizing apparatuses, such as, for example, partial vaporizers, flat evaporators, strand devolatilizers, thin-film evaporators or devolatilizing extruders, for example, are used. As a result of the low residual monomer content and also solvent content, the molding composition used in accordance with the invention is low in odor and is therefore outstandingly suitable for 3D printers in the home-use segment, and also for 3D printers employed industrially.

Furthermore, the molding composition contains not more than 500 ppm, preferably not more than 400 ppm, more preferably not more than 300 ppm of transition metals such as Fe, Mn, and Zn, for example. Molding compositions with a low level of transition metals of this kind can be obtained, for example, by using redox initiators—if used to initiate the polymerization of the polymers present in the molding composition—only in small amounts in combination with peroxides. Furthermore, therefore, there ought to be only small amounts of transition metal-containing minerals (e.g., pigments) present in the molding composition.

The viscosity of the overall molding composition at shear rates of 1 to 10 1/s and at temperatures of 250° C. is not higher than $1 \times 10^5$ Pa*s, preferably not higher than $1 \times 10^4$ Pa*s, more preferably not higher than $1 \times 10^3$ Pa*s.

The melt volume rate (MVR, measured to ISO 1133-1: 2011 at 240° C. and 10 kg load) of the molding composition used in accordance with the invention is generally more than 15 ml/10 min, preferably more than 20 ml/10 min.

The aforementioned molding compositions are used in accordance with the invention for producing three-dimensional objects of predetermined shape (moldings) by means of a device for 3D printing.

Preference is given to the use of the aforesaid molding composition in 3D printers which are suitable for the fused deposition modeling (FDM) method.

It is possible here to use customary apparatuses suitable for 3D printing, especially 3D printers for home use. Likewise suitable are 3D printers for the industrial sphere.

The three-dimensional object is generally built up under computer control from the fluidized molding composition used in accordance with the invention, according to mandated dimensions and shapes (CAD).

The three-dimensional object can be produced using customary methods of 3D printing in accordance with the prior art as described for example in EP 1015215 B1 and in US 2009/0295032 A1.

Customarily, first of all, the molding composition used in accordance with the invention is fluidized and extruded, a plurality of layers of the molding composition are applied to a base such as a support or to a preceding layer of the molding composition, and then the shaped material is consolidated by cooling below the solidification temperature of the molding composition.

In one preferred embodiment, in a 3D printer with a heating nozzle freely movable in the fabrication plane, a supplied filament of the molding composition of the invention is fluidized, and the fluidized molding composition is extruded, applied layer by layer, by means of the fused deposition modeling method, and consolidated, optionally by cooling. The nozzle temperature is generally 200 to 270° C., preferably 230 to 250° C., especially 240° C.

The molding compositions used in accordance with the invention exhibit an optimized toughness/viscosity balance and are therefore outstandingly suitable for 3D printing. From the aforesaid molding compositions, 3D printing can be used to obtain three-dimensional objects which are notable for high quality, i.e., low warp, high dimensional stability, and good layer adhesion of the contact area between the layers.

Particularly preferred is the use of the aforesaid molding compositions for the 3D printing of three-dimensional objects with bridging. The invention is described in more detail by the examples below and by the claims.

EXAMPLES

The following molding compositions were used and investigated in the inventive and comparative examples:

1A: molding composition composed of 85 wt % of SAN copolymer a1 and 15 wt % of ABS graft copolymer, MVR (cm$^3$/10 min): 55
1B: molding composition composed of 85 wt % of SAN copolymer a2 and 15 wt % of ABS graft copolymer, MVR (cm$^3$/10 min): 37
1C: molding composition composed of 85 wt % of SAN copolymer a3 and 15 wt % of ABS graft copolymer, MVR (cm$^3$/10 min): 9
1D: molding composition composed of 85 wt % of SAN copolymer a4 and 15 wt % of ABS graft copolymer, MVR (cm$^3$/10 min): 12
1E: molding composition composed of 85 wt % of SAN copolymer a5 and 15 wt % of ABS graft copolymer, MVR (cm$^3$/10 min): 43
2A: molding composition composed of 70 wt % of SAN copolymer a1 and 30 wt % of ABS graft copolymer, MVR (cm$^3$/10 min): 36
2B: molding composition composed of 70 wt % of SAN copolymer a2 and 30 wt % of ABS graft copolymer, MVR (cm$^3$/10 min): 24
2C: molding composition composed of 70 wt % of SAN copolymer a3 and 30 wt % of ABS graft copolymer, MVR (cm$^3$/10 min): 6
2D: molding composition composed of 70 wt % of SAN copolymer a4 and 30 wt % of ABS graft copolymer, MVR (cm$^3$/10 min): 8
2E: molding composition composed of 70 wt % of SAN copolymer a5 and 30 wt % of ABS graft copolymer, MVR (cm$^3$/10 min): 27
3A: molding composition composed of 55 wt % of SAN copolymer a1 and 45 wt % of ABS graft copolymer, MVR (cm$^3$/10 min): 22
3B: molding composition composed of 55 wt % of SAN copolymer a2 and 45 wt % of ABS graft copolymer, MVR (cm$^3$/10 min): 14
3C: molding composition composed of 55 wt % of SAN copolymer a3 and 45 wt % of ABS graft copolymer, MVR (cm$^3$/10 min): 4
3D: molding composition composed of 55 wt % of SAN copolymer a4 and 45 wt % of ABS graft copolymer, MVR (cm$^3$/10 min): 5
3E: molding composition composed of 55 wt % of SAN copolymer a5 and 45 wt % of ABS graft copolymer, MVR (cm$^3$/10 min): 16
4: Terblend® N NM-21 EF from Styrolution, a blend of polyamide 6 with a SAN copolymer impact-modified using ABS graft rubber, in a weight ratio of 50:50, compatibilized with a SANMAn copolymer containing 2% of MAn and stabilized with respect to light and oxidation, MVR (cm$^3$/10 min) measured to ISO 1133-1: 2011 at 240° C. and 10 kg load: 60.

The molding compositions 1A to 1E, 2A to 2E, and 3A to 3E (produced as in WO 2015/091817 A1, pages 44 to 47) are noninventive examples. The MVR values of the molding compositions 1A-3E were measured to ISO 1133-1:2011 at 220° C. and 10 kg load.

The molding composition 4 is an inventive example.

SAN copolymers a1 to a5 as follows were used in the molding compositions 1A to 1E, 2A to 2E, and 3A to 3E:
a1: SAN copolymer with 73 wt % of styrene and 27 wt % of acrylonitrile (=S/AN 73/27), MVR (220° C./10): 55 ccm/10 min
a2: SAN copolymer (S/AN 81/19), MVR (220° C./10'): 46 ccm/10 min
a3: SAN copolymer (S/AN 75/25), MVR (220° C./10'): 10 ccm/10 min
a4: SAN copolymer (S/AN 65/35), MVR (220° C./10'): 16 ccm/10 min
a5: SAN copolymer (S/AN 65/35), MVR (220° C./10'): 61 ccm/10 min The impact modifier used for the molding compositions 1A to 1E, 2A to 2E, and 3A to 3E was an ABS graft copolymer having a trimodal particle size distribution (WO 2015/091817 A1, pages 44 to 45). The composition and preparation of the molding compositions 1A to 1E, 2A to 2E, and 3A to 3E are described in WO 2015/091817 A1 (pages 44 to 47).

The molding compositions 1A to 1E, 2A to 2E, and 3A to 3E were each stabilized with 0.2 wt % of Irganox 1076 and 0.3 wt % of Irganox PS802.

Fused Deposition Modeling Trials for Investigating the Bridging Quality

Figure 1:
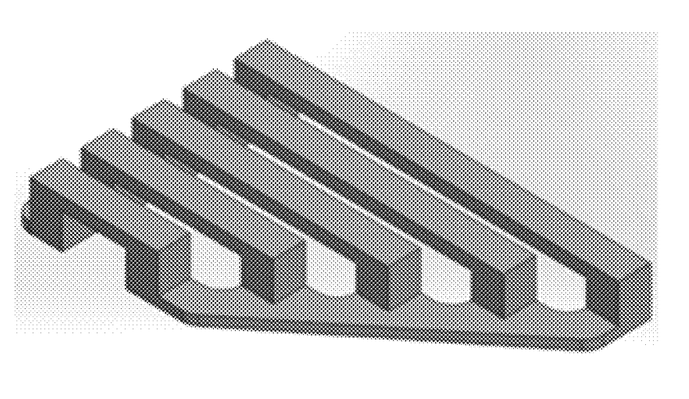

FIG. 1 shows a test body with bridges of different lengths. Test bodies of this kind with bridging were produced by means of the FDM method from the molding compositions 1A to 4. The production conditions can be seen from table 1 below.

TABLE 1

| | |
|---|---|
| 3D printer | Reconstruction based on Ultimaker 1 |
| Slicer | CuraEngine |
| Interface | pronterface |
| Nozzle diameter | 0.4 mm |
| Nozzle temperature | 240° C. |
| Printing bed | Aluminum + polyimide (Kapton) |
| Printing bed temperature | 135° C. |
| Building space temperature | about 40° C. to 55° C. |
| Sample form | Bridge Length 10/20/30/40/50 mm Width 5 mm Height 2 mm |
| Layer thickness | 0.25 mm |
| Degree of fill | 30% |
| Printing speed | 30 mm/s |

To assess the quality of the test body obtained by 3D printing, the quality of the bridge was assessed by visual control (inspection).

The criteria here were as follows:

| Criterion | Points |
|---|---|
| Bridge printed | +2 |
| Individual, mobile, sagging strands | −1 |
| Fill structure evident | −1 |

According to this rating scale, an optimum bridge achieves 2 points, and for individual, mobile, sagging strands and an evident fill structure it is possible to subtract a total of up to 2 points—accordingly, a zero is a poor result.

The results achieved are shown in table 2.

With the inventive molding composition 4, very good test bodies (total point count: 7) were obtained, which were consistently rated with 1 to 2 scoring points and which exhibit good quality (1 scoring point) even at a bridge length of 50 mm. From the majority of molding compositions of the comparative examples, it was not possible to obtain a bridge of satisfactory quality for a bridge length of 50 mm, and so the test bodies were scored with zero points.

TABLE 2

| | Scoring points of the test bodies from molding compositions 1A to 3E Molding composition | | | | | | | |
|---|---|---|---|---|---|---|---|---|
| Bridging (length) | 1A | 1B | 1C | 1D | 1E | 2A | 2B | 2C |
| 10 mm | 2 | 2 | 2 | 2 | 2 | 2 | 2 | 2 |
| 20 mm | 1 | 1 | 2 | 2 | 2 | 0 | 1 | 2 |
| 30 mm | 1 | 1 | 0 | 1 | 1 | 1 | 1 | 0 |
| 40 mm | 2 | 0 | 1 | 1 | 0 | 1 | 0 | 0 |
| 50 mm | 1 | 0 | 0 | 0 | 0 | 0 | 0 | 0 |
| Total point count | 7 | 4 | 5 | 6 | 5 | 4 | 4 | 4 |

| | Scoring points of the test bodies from molding compositions 1A to 3E Molding composition | | | | | | | |
|---|---|---|---|---|---|---|---|---|
| Bridging (length) | 2D | 2E | 3A | 3B | 3C | 3D | 3E | 4 |
| 10 mm | 2 | 2 | 2 | 2 | 2 | 2 | 2 | 2 |
| 20 mm | 2 | 2 | 1 | 1 | 2 | 2 | 2 | 1 |
| 30 mm | 0 | 1 | 1 | 0 | 0 | 0 | 0 | 1 |
| 40 mm | 0 | 0 | 1 | 1 | 0 | 0 | 0 | 2 |
| 50 mm | 0 | 0 | 0 | 0 | 0 | 0 | 0 | 1 |
| Total point count | 4 | 5 | 5 | 4 | 4 | 4 | 4 | 7 |

The invention claimed is:

1. A method of producing a three-dimensional object by 3D printing, comprising the steps of:
   providing a thermoplastic molding composition consisting of a mixture of the components A to E:
   A: 35 to 60 wt % of at least one impact-modified polymer A, consisting of the components a and b:
      a: 30 to 95 wt % of at least one styrene-acrylonitrile copolymer a having an average molar mass Mw of 150 000 to 350 000 g/mol, obtained by polymerization of:
         a1: 18 to 35 wt % of acrylonitrile (AN), and
         a2: 82 to 65 wt % of styrene (S); and
      b: 5 to 70 wt % of at least one graft copolymer b as impact modifier, with
         b1: 45 to 85 wt % of a graft base b1, obtained by polymerization of:
            b11: 80 to 100 wt % of 1,3-butadiene, and
            b12: 0 to 20 wt % of styrene; and
         b2: 15 to 55 wt % of a graft b2, obtained by polymerization of:
            b21: 70 to 90 wt % of styrene; and
            b22: 10 to 30 wt % of acrylonitrile;
   B: 33 to 58 wt % of at least one polyamide B selected from the following: polyamide 6 (polycaprolactam), polyamide 6,6 (polyhexamethyleneadipamide), polyamide 4,6 (polytetramethyleneadipamide), polyamide 5,10 (polypentamethyleneadipamide), polyamide 6,10 (polyhexamethylenesebacamide), polyamide 7 (polyenantholactam), polyamide 11 (polyundecanolactam), and polyamide 12 (polydodecanolactam);
   C: 1 to 10 wt % of at least one compatibilizer C based on a styrene-acrylonitrile-maleic anhydride terpolymer obtained by polymerization of:
      C1: 72 to 84.5 wt % of styrene;
      C2: 15 to 27.5 wt % of acrylonitrile; and
      C3: 0.5 to 5 wt % of maleic anhydride;
   D: 0.01 to 5 wt % of one or more auxiliaries selected from the following: stabilizers, oxidation retarders, agents against thermal decomposition and decomposition by ultraviolet light, lubricants and mold release agents, processing assistants, and plasticizers; and
   E: 0 to 30 wt % of one or more further additives E;
   where the sum of the components A, B, C, D, and, if present, E makes 100 wt %;
   fluidizing the thermoplastic molding composition;
   extruding the thermoplastic molding composition;
   applying a plurality of layers of the thermoplastic molding composition to a base or to a preceding layer of the thermoplastic molding composition; and
   consolidating the thermoplastic molding composition to produce the three-dimensional object.

2. A method of claim 1, wherein the viscosity (measured to ISO 11443:2014) of the molding composition at shear rates of 1 to 10 1/s and at temperatures of 250° C. is not more than $1 \times 10^5$ Pa*s and the melt volume rate (MVR, measured to ISO 1133-1:2011 at 240° C. and 10 kg load) of the molding composition is more than 15 ml/10 min.

3. A method of claim 1, wherein component B is polyamide 6.

4. A method of claim 1, wherein the thermoplastic molding composition consists of:
   35 to 50 wt % of component A,
   40 to 58 wt % of component B,
   1 to 10 wt % of component C, 0.01 to 5 wt % of component D, and
0 to 20 wt % of component E.

5. A method of claim 1, wherein the thermoplastic molding composition consists of:
35 to 50 wt % of component A,
45 to 58 wt % of component B,
1 to 10 wt % of component C,
0.01 to 5 wt % of component D, and
0 to 10 wt % of component E.

6. A method of claim 1, wherein the thermoplastic molding composition consists of:
40 to 50 wt % of component A,
45 to 55 wt % of component B,
2 to 6 wt % of component C,
0.05 to 3 wt % of component D, and
0 to 10 wt % of component E.

7. A method of claim 1, wherein in the impact-modified polymer A, the fraction of component a is 30 to 60 wt % and the fraction of the graft copolymer b used as impact modifier is 70 to 40 wt %.

8. A method of claim 1, wherein at least one graft copolymer b is used with:
50 to 80 wt % of a graft base b1 obtained by polymerization of:
b11: 100 wt % of butadiene; and
20 to 50 wt % of a graft b2 obtained by polymerization of:
b21: 70 to 90 wt % of styrene, and
b22: 10 to 30 wt % of acrylonitrile.

9. A method of claim 1, wherein the particle size ($d_{50}$) of the graft copolymer b is at least 80 nm and at most 1 µm.

10. A method of claim 1, wherein the three-dimensional object are bridges.

11. A method of claim 7, wherein in the impact-modified polymer A, the fraction of component a is 40 to 60 wt %, and the fraction of the graft copolymer b used as impact modifier is 60 to 40 wt %.

12. A method of claim 8, wherein the at least one graft copolymer b is used with:
50 to 80 wt % of a graft base b1 obtained by polymerization of:
b11: 100 wt % of butadiene; and
20 to 50 wt % of a graft b2 obtained by polymerization of:
b21: 72.5 to 85 wt % of styrene, and
b22: 15 to 27.5 wt % of acrylonitrile.

13. A method of claim 9, wherein the particle size ($d_{50}$) of the graft copolymer b is 100 nm to 600 nm.

* * * * *